(12) United States Patent
Dischamp et al.

(10) Patent No.: US 8,245,942 B2
(45) Date of Patent: Aug. 21, 2012

(54) DUAL MODE SMART CARD AND SMART CARD CONTROLLER

(75) Inventors: Sylvestre F Dischamp, Toulouse (FR); Stephane Gasparini, Tournefeuille (FR); Anthony Pele, Toulouse (FR)

(73) Assignee: Motorola Mobility LLC, Libertyville, IL (US)

( * ) Notice: Subject to any disclaimer, the term of this patent is extended or adjusted under 35 U.S.C. 154(b) by 664 days.

(21) Appl. No.: 12/328,294

(22) Filed: Dec. 4, 2008

(65) Prior Publication Data

US 2009/0166423 A1  Jul. 2, 2009

(30) Foreign Application Priority Data

Dec. 31, 2007 (EP) .................................. 07305012

(51) Int. Cl.
G06K 19/06 (2006.01)
(52) U.S. Cl. ......................................................... 235/492
(58) Field of Classification Search .................. 235/439, 235/441, 492; 710/11, 305
See application file for complete search history.

(56) References Cited

U.S. PATENT DOCUMENTS

| | | | |
|---|---|---|---|
| 6,438,638 B1 * | 8/2002 | Jones et al. | 710/301 |
| 6,801,956 B2 * | 10/2004 | Feuser et al. | 710/14 |
| 7,150,397 B2 | 12/2006 | Morrow et al. | |
| 7,309,021 B2 * | 12/2007 | Morrow et al. | 235/492 |
| 7,369,982 B2 * | 5/2008 | Leaming | 703/25 |
| 7,383,982 B2 * | 6/2008 | Yamamoto et al. | 235/375 |
| 2003/0155420 A1 | 8/2003 | Morrow et al. | |
| 2003/0226898 A1 * | 12/2003 | Chen et al. | 235/492 |
| 2005/0005045 A1 | 1/2005 | Kim et al. | |

OTHER PUBLICATIONS

European Patent Office, "Communication", for European Patent Application No 07305012.2, Aug. 5, 2008, 7 pages.
Patent Cooperation Treaty, "PCT Search Report and Written Opinion of the International Searching Authority," for International Application No. PCT/US2008/087648, Mar. 24, 2009, 12 pages.

* cited by examiner

Primary Examiner — Seung Lee

(57) ABSTRACT

A dual mode smart card controller, a dual mode smart card, and a wireless communication device incorporating one or more of the same are provided. The dual mode smart card controller includes a first controller adapted for supporting communications with a first smart card protocol, and a second controller adapted for supporting communications with a second smart card protocol. The dual mode smart card controller further includes a multiplexer module having two sets of multiplexed ports that are selectively coupled to a common set of ports, and an interface module coupled to the common set of ports, and adapted to be coupled to signal terminals of a smart card. The multiplexer module selectively couples one or more signals received from the smart card via the signal terminals to one of the first controller and the second controller. The smart card uses at least one of a same connection associated with the common set of ports for use with both of the first controller and the second controller.

20 Claims, 5 Drawing Sheets

DUAL MODE SMART CARD AND SMART CARD CONTROLLER

FIELD OF THE INVENTION

The present invention relates generally to smart card controllers, and more particularly, to the multiplexing of mode specific signals via a shared set of ports to support interaction with smart cards associated with one or more different modes using a reduced number signal terminals and corresponding circuitry associated with the reduced number of signal terminals.

BACKGROUND OF THE INVENTION

SIM Cards or Subscriber Identity Modules are smart cards used in cellular radio telephone devices for storing subscriber information, that can readily be moved with the card from one radio telephone device to another radio telephone device, thereby enabling a user to switch the device that they use to interact with the cellular telephone network. However, just like most other areas of technology, new standards supporting increasing levels of performance are regularly being implemented and adopted. The technological area of smart cards for use as Subscriber Identity Modules is no exception.

During at least some transitions to the use of a new technology, there is a period of time during which some of the devices support only the old standard, and during which some devices might only support the new standard. An ability to support both an old outgoing standard, as well as a new incoming standard would offer a greater amount of flexibility, and ease the transition between an older standard and a new standard. Consequently during periods of transitions in technology, a degree of backwards compatibility can be beneficial.

However, supporting multiple standards simultaneously can sometimes be less than straightforward and/or can sometimes involve less than optimal design decisions or compromises than if only one of the standards needed to be supported. Other times, simultaneously supporting multiple standards can involve separate sets of circuitry including some overlap and/or duplication in circuitry that is only used with individual ones of the multiple standards as part of providing support for the multiple modes. For example, different ones of the multiple standards may use a different subset of the available interface pins, where some of the pins are used for a common purpose across two or more of the multiple standards, while other ones of the pins are separately used, and/or the manner in which they are used changes between different ones of the standards.

Furthermore some of the standards might already support different revision levels of the technology requiring some degree of flexibility as part of the configuration of the interface relative to different standards as well as between different versions of or within a particular standard. For example, some standards might support multiple signaling voltage levels and/or speeds, which need to be detected and accommodated. More specifically, some standards might initiate communications between a SIM card and its host using the higher one of two signaling voltages, and change to the lower one of the two voltages after the card identifies itself as being a particular version of one of the standards. Alternatively, a pull-up or pull-down resistor could be used on one or more of the signal lines to distinguish between two or more different versions of a particular standard, that includes different signaling speeds.

The present inventors have recognized that in accommodating multiple standards and/or multiple revisions of a particular standard, that some of the circuitry used with one of the standards can be reused with one of the other standards, and that the ability to detect the particular standard that is currently being used and automatically configuring the smart card controller and/or the smart card for use with the detected one of the multiple supported standards would similarly be beneficial.

SUMMARY OF THE INVENTION

The present invention provides a dual mode smart card controller. The dual mode smart card controller includes a first controller adapted for supporting communications with a first smart card protocol, and a second controller adapted for supporting communications with a second smart card protocol. The dual mode smart card controller further includes a multiplexer module having two sets of multiplexed ports that are selectively coupled to a common set of ports, and an interface module coupled to the common set of ports, and adapted to be coupled to signal terminals of a smart card. The multiplexer module selectively couples one or more signals received from the smart card via the signal terminals to one of the first controller and the second controller. The smart card uses at least one of a same connection associated with the common set of ports for use with both of the first controller and the second controller.

In at least one embodiment, the multiplexer module includes a selection input, such as a a pull-up resistor or a pull-down resistor, coupled to one of the signal terminals, corresponding to a data signal of the signal terminals of the smart card in association with at least one of the first smart card protocol and the second smart card protocol.

The present invention further provides a dual mode smart card. The dual mode smart card includes a plurality of signal terminals, and a demultiplexer having a common set of ports including a plurality of ports respectively coupled to the plurality of signal terminals, and two sets of demultiplexed ports that are selectively coupled to the common set of ports. The dual mode smart card further includes a controller respectively coupled to each of the two sets of demultiplexed ports for respectively interacting with each of the two sets of demultiplexed ports using a first smart card protocol and a second smart card protocol, wherein the smart card uses at least one of a same connection associated with the common set of ports for interacting with both of the two sets of demultiplexed ports using the first smart card protocol and the second smart card protocol.

The present invention still further provides a dual mode smart card incorporated as part of a wireless communication device, where the wireless communication device includes an antenna, and a wireless communication module including at least one of a wireless receiver, a wireless transmitter, or a wireless transceiver.

In at least one embodiment, the wireless communication device further includes a smart card, such as a dual mode smart card.

These and other features, and advantages of this invention are evident from the following description of one or more preferred embodiments of this invention, with reference to the accompanying drawings.

DETAILED DESCRIPTION OF THE PREFERRED EMBODIMENT(S)

Figure 1:
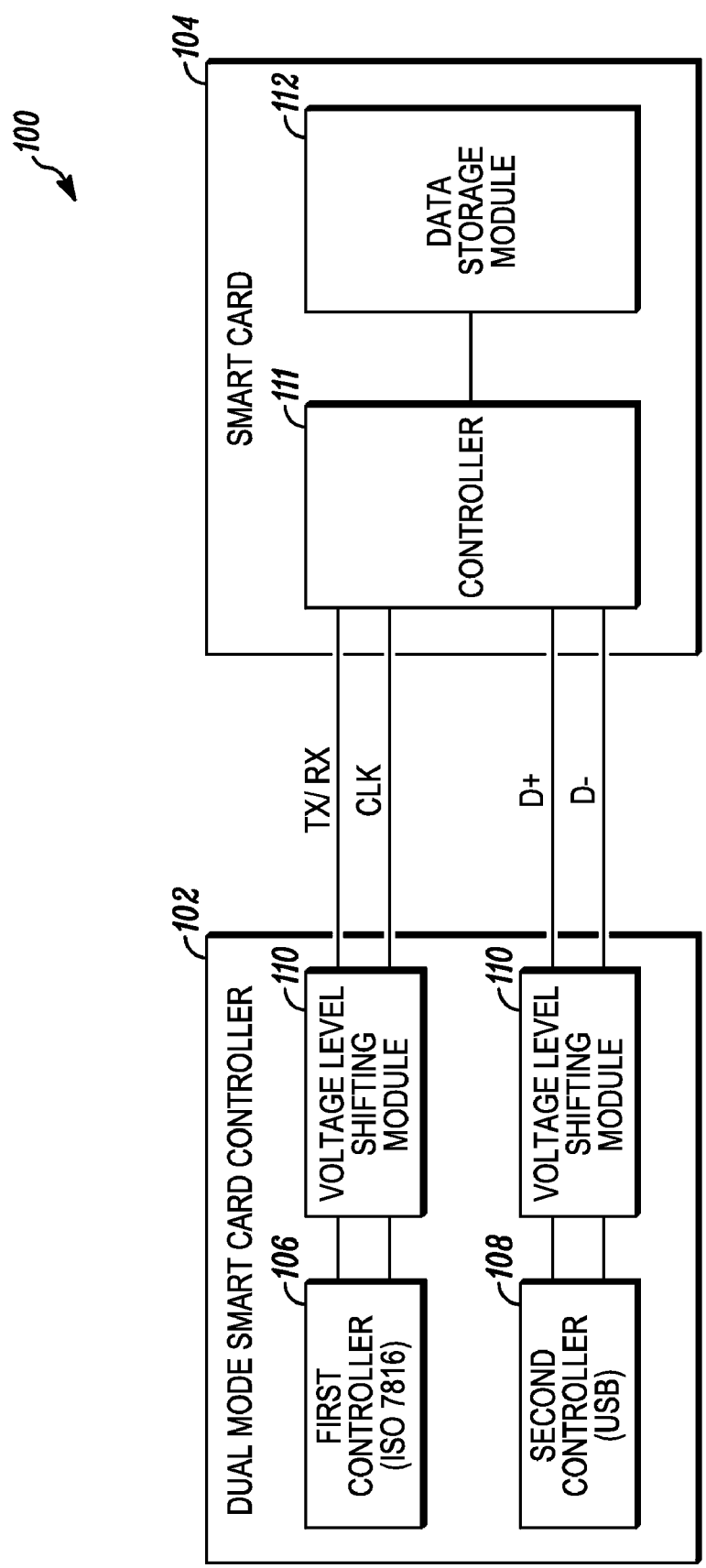
FIG. 1 is a block diagram of an existing dual mode smart controller adapted for interacting with a smart card using one of two smart card protocols, and corresponding smart card.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a block diagram 100 of an existing dual mode smart controller 102 adapted for interacting with a smart card 104 using one of two smart card protocols, and corresponding smart card. The dual mode smart card controller 102 includes a first controller 106 adapted for interacting with the smart card 104 using a first protocol and a second controller 108 adapted for interacting with the smart card 104 using a second protocol. In the illustrated embodiment the first controller 106 supports a protocol in compliance with ISO 7816, an International Organization for Standardization (ISO) standard related to electronic identification cards, such as smart cards, which includes an earlier asynchronous type protocol and a later synchronous type protocol. The second controller supports a protocol in compliance with the USB standard, which is sometimes referred to as a Universal Serial Bus. While the USB standard was originally developed for the purpose of connecting personal computers to peripherals, the USB standard has more recently been used to support device interconnectivity between other types of devices including cellular radio telephone smart card interfaces. While both of the protocols support the communication of data between devices, each of the protocols include differences in the manner in which the data is communicated. For example, USB supports a differential data signal, while ISO7816 supports a single ended form of signaling, generally involving a clock signal communicated on a separate signal conductor.

Each of the first controller 106 and the second controller 108 are coupled to the smart card via voltage level shifting modules 110, which translate the voltage signal levels internal to the dual mode smart card controller 102 to the voltage levels expected by the smart card. At least some earlier smart cards were adapted to receive 3V signals, while some later smart cards were adapted to receive 1.8V signals. Even after the 1.8V level signals were adopted into the standard, many smart cards were designed to initially receive signaling at a 3V level, until the identity of the type of card could be detected and the appropriate voltage level determined. Still further distinct versions of the USB standard involved protocols that supported different transmission speeds. In order to differentiate between low speed signaling and high speed signaling the smart card made use of a pull-up resistor alternatively coupled to one of the two differential voltage signals D+ or D−.

A smart card controller can often times be incorporated into a baseband IC, which would transmit and receive the signals intended to interact with the smart card 104. The signals produced at an input/output terminal of the baseband IC would then be mapped to corresponding terminals of the smart card. In at least some instances, the smart card has eight terminals over which the signals of the various supported protocols are mapped. Between the ISO7816 protocol and the USB protocol, power and ground terminals are commonly shared, while the signaling terminals associated with each of the protocols are often mapped to distinct terminals. In addition to the commonly defined or shared terminals, the USB protocol support at least two additional terminals, D+ and D− terminals, while ISO7816 additionally support at least a TX/RX terminal and a clock terminal. Generally, ISO7816 additionally support a Reset (RST) and sometimes a still further signal, namely a programming power connection (Vpp).

This has previously resulted in additional terminals of a dual mode smart card controller, such as a baseband IC, being dedicated to a signal used to support each of multiple (i.e. a pair) of protocols. Still further, the distinct interface terminals often involve separate voltage level shifting modules intended to support each of the terminals supporting one or more of the protocols. However, for some circuits and/or integrated circuits there can be substantial benefit in managing (i.e. reducing) the overall number of input/output terminals, and because voltage level adjusting circuits can be quite expensive costwise and/or real estate wise in an IC, reducing the number of circuits required to adjust voltage levels can similarly be beneficial.

In turn, the smart card 104, typically employs a controller 111 in the form of a microprocessor, which handles the appropriate signaling exchanges for interacting with the smart card controller to establish a data connection, as well as supply the requested data. The data often can be found in a data storage module 112, which is coupled to the controller 111. The data storage module is typically in the form of some type of static RAM or ROM, which generally can retain its value even when power is removed.

Figure 2:
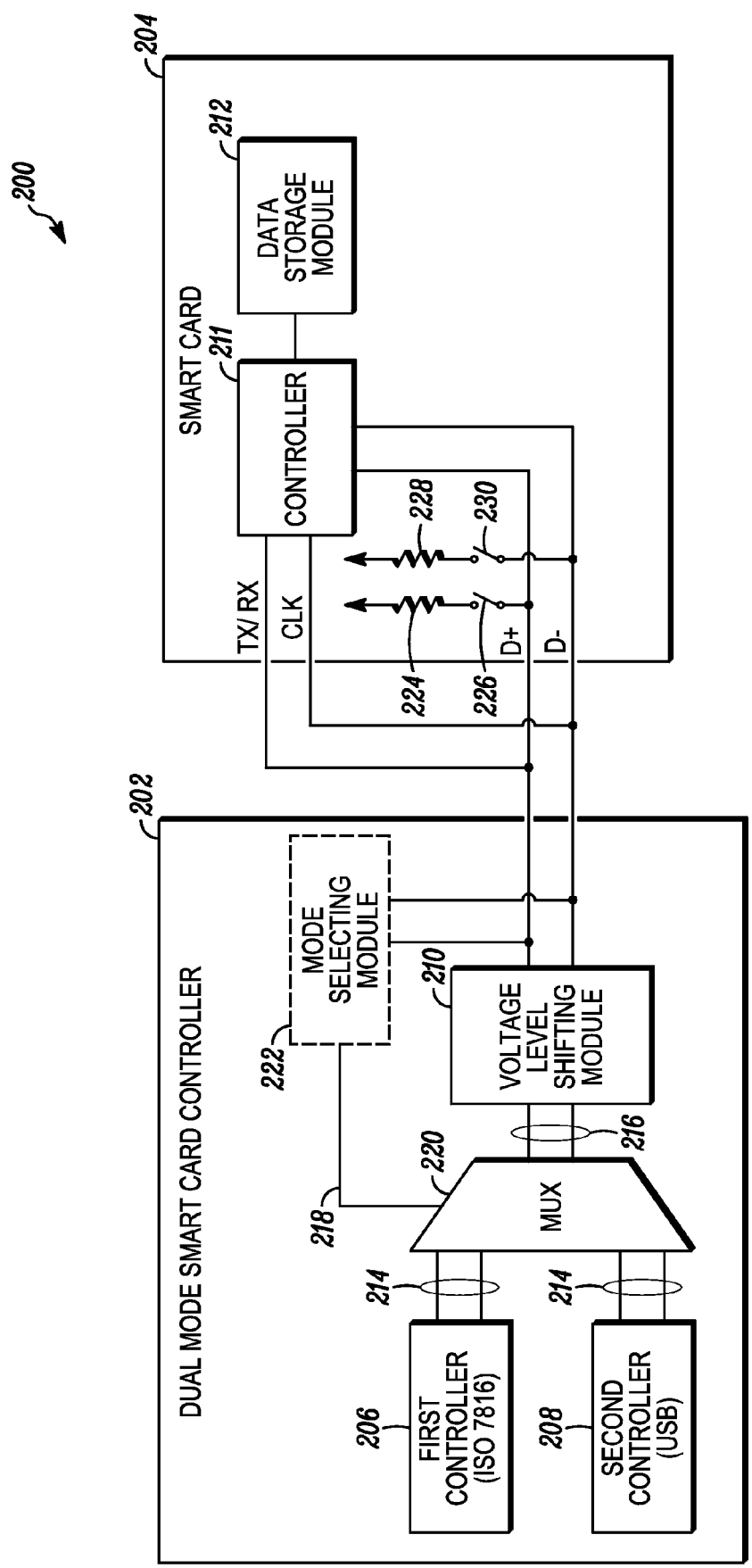
FIG. 2 is a block diagram of a dual mode smart card controller and corresponding smart card, in accordance with at least one embodiment of the present invention.

FIG. 2 illustrates a block diagram 200 of a dual mode smart card controller 202 and corresponding smart card 204, in accordance with at least one embodiment of the present invention, which in turn serves to reduce the overall number of connections for supporting each of multiple smart card modes, including the number of voltage level shifting modules. Similar to the dual mode smart card controller 102 illustrated in FIG. 1, dual mode smart card controller 202 includes a first controller 206, and a second controller 208. In at least one exemplary embodiment, the first controller 206 and second controller 208 respectively support communications using the ISO 7816 protocol and the USB protocol. At least some of the signals from the first controller 206 and the second controller 208 are respectively coupled to two sets of multiplexed ports 214, which can be selectively coupled to a common set of ports 216, dependent upon the value of a select signal 218 received by the multiplexer 220. The common set of ports 216 are then mapped to respective terminals supporting communications via each of multiple protocols, after having had their voltage levels adjusted by a shared level shifter module 210. In the illustrated example, a pair of terminals are multiplexed for each of the supported protocols, including a TX/RX terminal and a CLK terminal for the ISO 7816 protocol, and a D+ terminal and a D− terminal for the USB protocol. The terminals 216 and voltage level shifting module 210 can generally be shared in instances where only one of the two modes of can be active at a time. Presumably, the controller 211 of the smart card 204, supporting only one protocol and/or knowing which protocol is currently active can make use of the signal received from the shared terminal appropriately.

For smart cards that only support one of the two modes, the signals received at the set of terminals associated with the unsupported mode will generally be ignored, and the signals received at the set of terminals associated with the supported mode will be acted upon. Consequently, the receipt of a differential data signal by a USB smart card consistent with a USB mode at terminals associated with the TX/RX and CLK terminal is generally acceptable as the controller is not concurrently configured to accept signals from the terminals associated with TX/RX and CLK in an ISO 7816 mode. The opposite is similarly true, in so far as smart cards that support an ISO 7816 mode, will generally ignore inputs received on the terminals associated with D+ and D− of the USB mode, as these particular terminals are generally not used by the ISO 7816 protocol.

However in order to identify which one of the two protocols and correspondingly which one of the two sets of multiplexed ports should be selected, the ports associated with D+ and D− of the USB mode can be observed directly, or via a mode selecting module 222. This is because the USB protocol provides for the respective selective coupling of a pull up resistors 224 or 228 to D+ or D− dependent upon whether an attached USB smart card is operating in low speed mode or full speed mode. The pull up resistors can be selectively coupled to their respective data lines via switches 226 and 230. By observing both lines, one can distinguish between a USB mode of operation and an ISO 7816 mode of operation, where the ISO 7816 mode of operation does not similarly place a pull up resistor on either of the correspondingly multiplexed lines. Consequently, detection of a pull up resistor on either of these two lines is indicative of a USB mode smart card being attached.

In at least some embodiments, it may be sufficient to observe D+ or D− of the USB mode directly and use the presence of a pulled up signal to set the select line of the multiplexer 220. Alternatively, a mode selecting module 222 can produce a similar effect through corresponding logic circuitry and latching circuitry. In this way, the dual mode smart card controller 202 can be appropriately configured to match the mode of operation of the smart card 204 for accessing the data stored in the corresponding data storage module 212.

Figure 3:
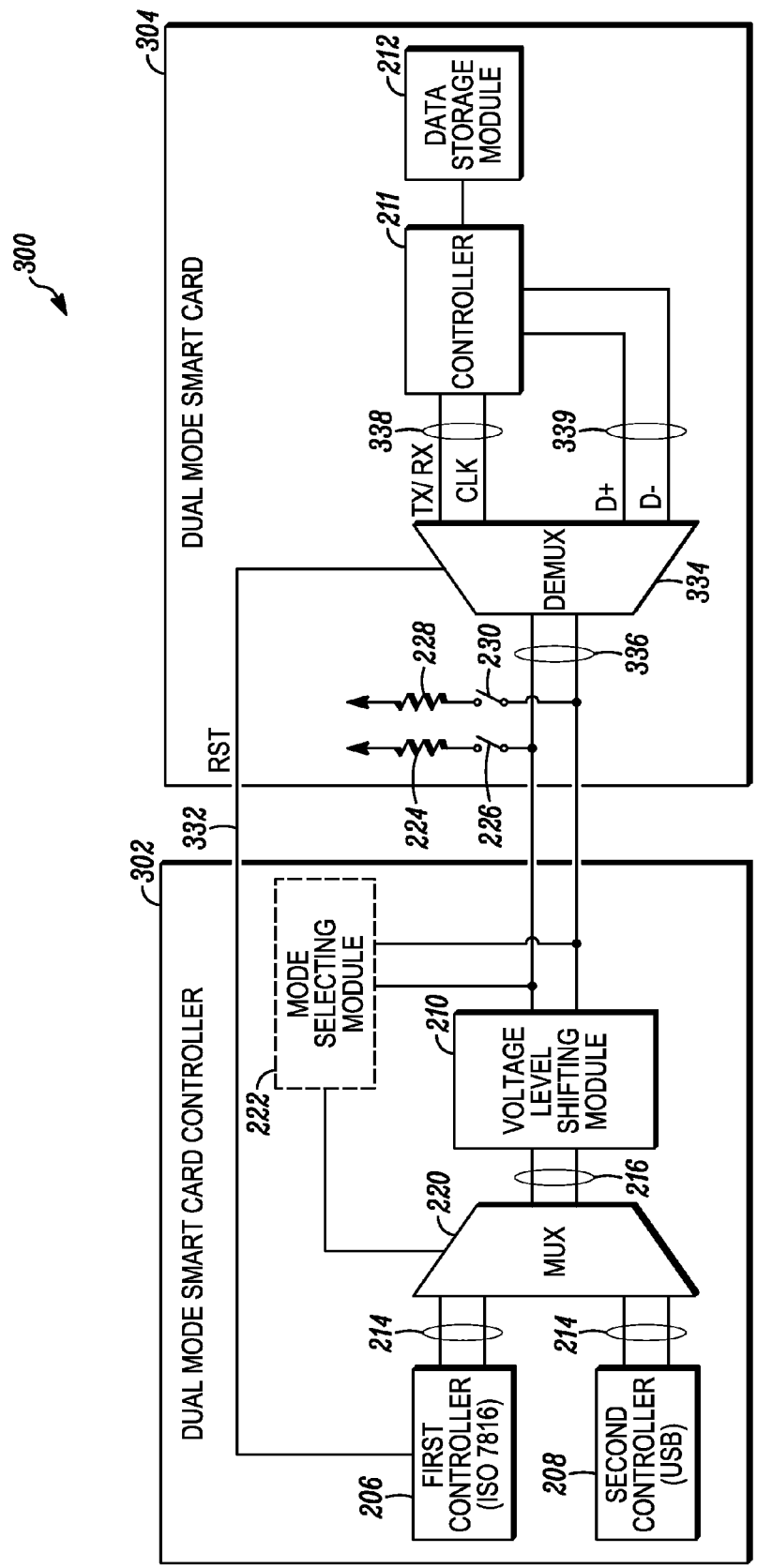
FIG. 3 is a block diagram of a dual mode smart card controller and dual mode smart card, in accordance with at least a further embodiment of the present invention.

FIG. 3 illustrates a block diagram 300 of a dual mode smart card controller 302 and dual mode smart card 304, in accordance with at least a further embodiment of the present invention. The circuitry illustrated by block diagram 300 operates in a similar manner to the circuitry described in connection to the block diagram illustrated in FIG. 2, with the exception that the smart card 304 in FIG. 3, is capable of operating in dual modes. Correspondingly, a demultiplexing of the data lines being received from the dual mode smart card controller, whether the data lines are coming from a dual mode smart card controller 302, or not, is possible. Furthermore, the smart card controller 302 shows a reset line 332 that is generally available to the smart card 304 in connection with an ISO 7816 mode of operation.

In order to determine how to demultiplex the data lines, the dual mode smart card 304 monitors a non-shared reset line used in an ISO 7816 mode of operation. If an active reset signal is detected, then the demultiplexer couples the common set of ports 336 including signals received from the smart card controller 302 to the set of demultiplexed ports corresponding to the ISO 7816 input terminals 338 that are associated with the shared terminals. Alternatively, the common set of ports 336 is coupled to the set of demultiplexed ports corresponding to the USB input terminals 339, which are shared through the common set of ports. Upon detection of receipt of an active RST signal 332, the demultiplexer 334 can latch the appropriate select value on the corresponding select line of the demultiplexer 334.

Figure 4:
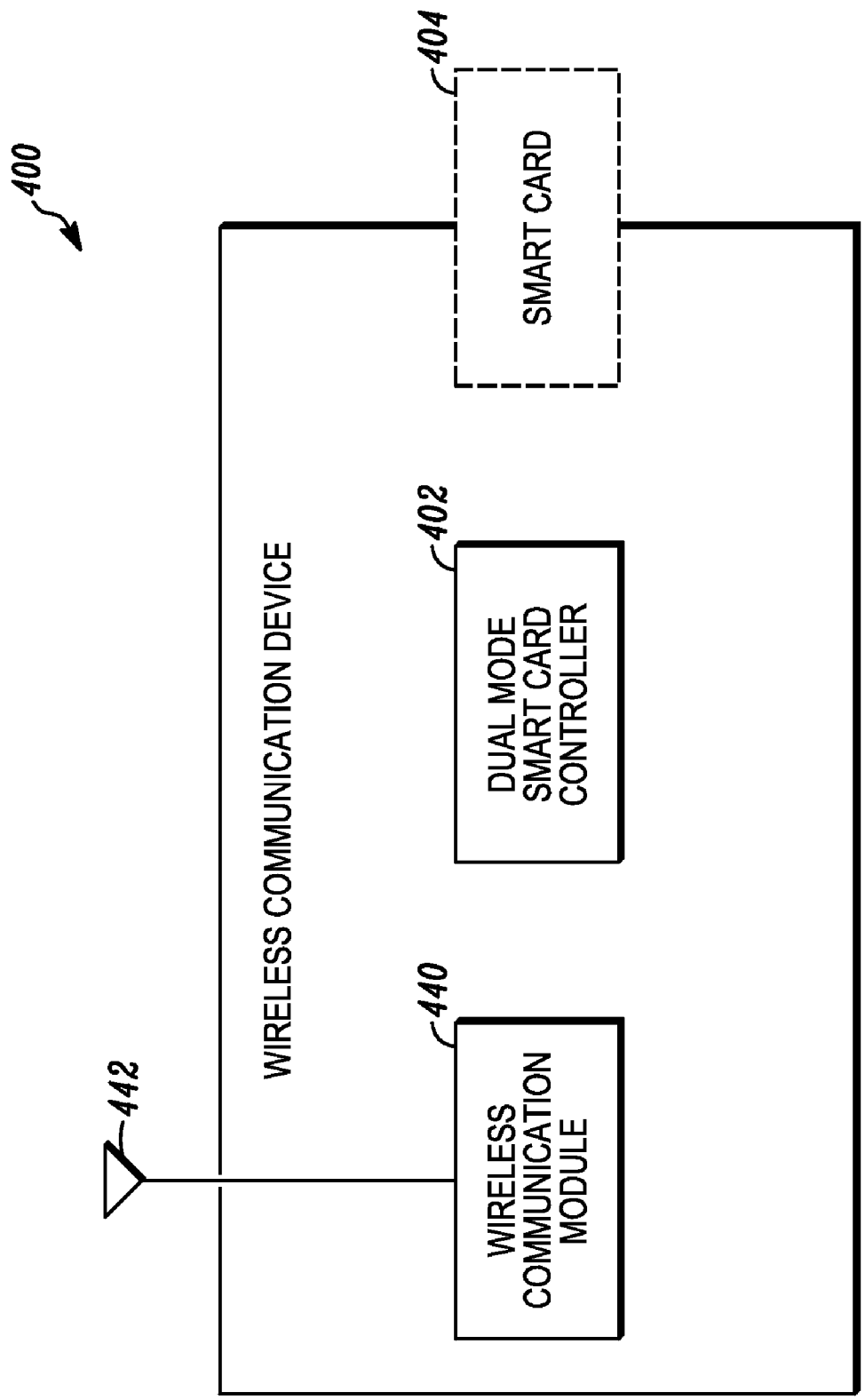
FIG. 4 is a block diagram of a wireless communication device incorporating a dual mode smart card controller, in accordance with at least a still further aspect of the present invention.

FIG. 4 illustrates a block diagram 400 of a wireless communication device incorporating a dual mode smart card controller 402, in accordance with at least a still further aspect of the present invention. The wireless communication device further includes a wireless communication module 440 having at least one of a receiver, a transmitter, or a transceiver, and an antenna 442, which is coupled to the wireless communication module for facilitating a wireless communication connection with another device. The wireless communication device is further adapted to receive a smart card 404, upon which subscriber and/or account information can be stored and accessed by the dual mode smart card controller 402 regardless as to which of the at least two protocols associated with the dual mode smart card controller 402 are used.

While FIG. 4 illustrates a wireless communication device, one skilled in the art will readily appreciate that the dual mode smart card controller could alternatively be used in conjunction with other types of devices, which might benefit from accessing a smart card having potentially multiple modes of operation, and/or making use of one of multiple smart card protocols. By way of example, the present invention might be beneficially applied to different types of wireless communication devices such as a cell phone, a radiotelephone, or a cordless telephone, as well as potentially other types of wireless communication devices, non-wireless communication devices, as well as non-communication devices, such as paging devices, personal digital assistants, portable computers, pen-based or keyboard-based handheld devices, remote control units, digital cameras, video game players, audio players (such as an MP3 player) and the like.

Figure 5:
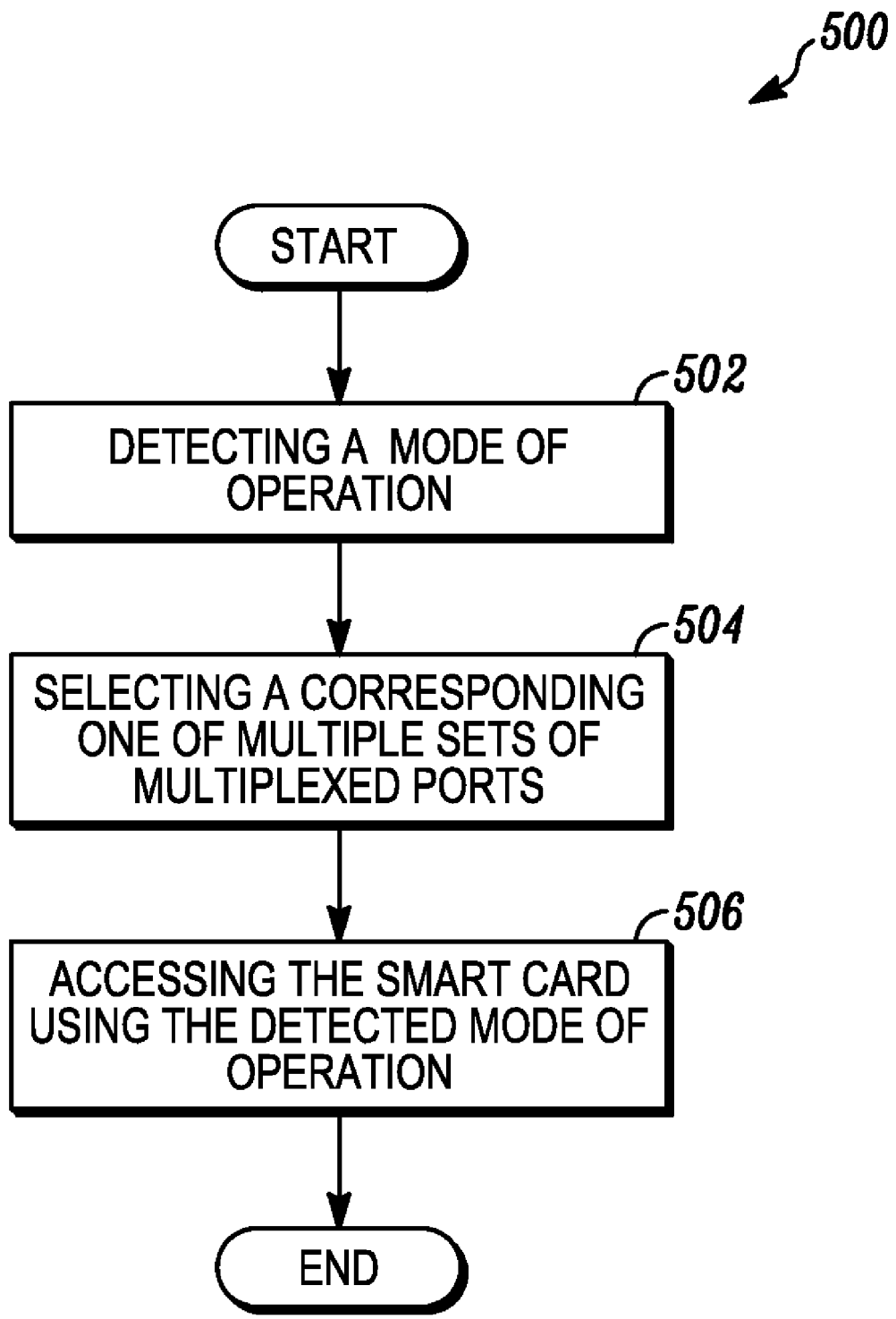
FIG. 5 is a flow diagram of a method for selecting one of two modes of operation in a dual mode smart card controller for interacting with a smart card, in accordance with at least one aspect of the present invention.

FIG. 5 illustrates a flow diagram of a method for selecting one of two modes of operation in a dual mode smart card controller for interacting with a smart card, in accordance with at least one aspect of the present invention. The method provides for detecting a mode of operation 502, and selecting 504 a corresponding one of the multiple sets of multiplexed ports. The smart card is then accessed 506 by the smart card controller using the detected mode of operation.

One skilled in the art will recognize that while the disclosed method describes a manner in which a dual mode smart card controller might select one of two modes of operation so as to match the operational mode of the smart card, in instances where the smart card is capable of operating in multiple modes of operation, the smart card could alternatively detect the modes of operation supported by the smart card controller and correspondingly access the smart card controller in the appropriate mode.

Furthermore, while the disclosed embodiments have generally been directed to multiple modes of operation including both ISO 7816 protocols and the USB protocols, one skilled in the art will readily appreciate that the beneficial teachings could be applied to different combinations of different supported protocols, without departing from the teachings of the present invention.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A dual mode smart card controller comprising:
a first controller adapted for supporting communications with a first smart card protocol;
a second controller adapted for supporting communications with a second smart card protocol, which is different than the first smart card protocol;
a multiplexer module having two sets of multiplexed ports that are selectively coupled to a common set of ports, and
an interface module coupled to the common set of ports, and adapted to be coupled to signal terminals of a smart card;
wherein the multiplexer module selectively couples one or more signals received from the smart card via the signal terminals to one of the first controller and the second controller; and
wherein the smart card uses at least one of a same connection associated with the common set of ports for use with different signals of both of the first controller and the second controller.

2. A dual mode smart card controller in accordance with claim 1, wherein the multiplexer module includes a selection input coupled to one of the signal terminals, corresponding to a data signal of the signal terminals of the smart card in association with at least one of the first smart card protocol and the second smart card protocol.

3. A dual mode smart card controller in accordance with claim 2, wherein the data signal of the signal terminals is coupled to one of a pull-up resistor or a pull-down resistor.

4. A dual mode smart card controller in accordance with claim 1, wherein the interface module includes a voltage level shifting module.

5. A dual mode smart card controller in accordance with claim 1, wherein the first controller includes an ISO7816 controller for interacting with a SIM smart card.

6. A dual mode smart card controller in accordance with claim 1, wherein the second controller includes a USB controller for interacting with a USB smart card.

7. A dual mode smart card controller in accordance with claim 1, wherein the dual mode smart card controller is incorporated as part of a baseband integrated circuit.

8. A dual mode smart card controller in accordance with claim 7, wherein the same connection associated with the common set of ports for both the first controller and the second controller is at an interface of the broadband integrated circuit.

9. A dual mode smart card controller in accordance with claim 1, wherein the dual mode smart card controller is incorporated as part of a wireless communication device.

10. A dual mode smart card in accordance with claim 9, wherein common set of ports includes at least one connection, which is used to provide a reset for a first one of the two sets of demultiplexed ports using the first smart card protocol, which is coupled to a select signal of the demultiplexer for controlling which one of the two sets of demultiplexed ports is currently coupled to the common set of ports.

11. A dual mode smart card in accordance with claim 9, wherein the first smart card protocol includes an ISO7816 protocol.

12. A dual mode smart card in accordance with claim 9, wherein the second smart card protocol includes a USB protocol.

13. A dual mode smart card comprising:
a plurality of signal terminals;
a demultiplexer having a common set of ports including a plurality of ports respectively coupled to the plurality of signal terminals, and two sets of demultiplexed ports that are selectively coupled to the common set of ports; and
a controller respectively coupled to each of the two sets of demultiplexed ports and for respectively interacting with each of the two sets of demultiplexed ports using a first smart card protocol and a second smart card protocol, which is different than the first smart card protocol; and
wherein the smart card uses at least one of a same connection associated with the common set of ports for interacting with different signals of both of the two sets of demultiplexed ports using the first smart card protocol and the second smart card protocol.

14. A dual mode smart card in accordance with claim 13, wherein the at least one connection, which is used to provide a reset for the first one of the two sets of demultiplexed ports using the first smart card protocol, is not used by a second one of the two sets of demultiplexed ports using the second smart card protocol.

15. A wireless communication device comprising:
an antenna;
a wireless communication module including at least one of a wireless receiver, a wireless transmitter, or a wireless transceiver; and
a dual mode smart card controller including:
a first controller adapted for supporting communications with a first smart card protocol;
a second controller adapted for supporting communications with a second smart card protocol, which is different than the first smart card protocol;
a multiplexer module having two sets of multiplexed ports that are selectively coupled to a common set of ports, and
an interface module coupled to the common set of ports, and adapted to be coupled to signal terminals of a smart card;
wherein the multiplexer module selectively couples one or more signals received from the smart card via the signal terminals to one of the first controller and the second controller; and
wherein the smart card uses at least one of a same connection associated with the common set of ports for use with different signals of both of the first controller and the second controller.

16. A wireless communication device in accordance with claim 15, wherein the multiplexer module includes a selection input coupled to one of the signal terminals, corresponding to a data signal of the signal terminals of the smart card in association with at least one of the first smart card protocol and the second smart card protocol.

17. A wireless communication device in accordance with claim 15 further comprising a smart card.

18. A wireless communication device in accordance with claim 17 wherein the smart card includes:
a plurality of signal terminals;
a demultiplexer having a common set of ports including a plurality of ports respectively coupled to the plurality of signal terminals, and two sets of demultiplexed ports that are selectively coupled to the common set of ports; and
a controller respectively coupled to each of the two sets of demultiplexed ports and for respectively interacting with each of the two sets of demultiplexed ports using a first smart card protocol and a second smart card protocol; and wherein the smart card uses at least one of a same connection associated with the common set of ports for interacting with both of the two sets of demultiplexed ports using the first smart card protocol and the second smart card protocol.

19. A wireless communication device in accordance with claim 15, wherein the first controller includes an ISO7816 controller for interacting with the smart card.

20. A wireless communication device in accordance with claim 15, wherein the second controller includes a USB controller for interacting with the smart card.

* * * * *